US006820715B2

(12) United States Patent
Laurent et al.

(10) Patent No.: US 6,820,715 B2
(45) Date of Patent: Nov. 23, 2004

(54) ELECTRICAL STEERING FOR VEHICLE, WITH TRIPLE REDUNDANCY

(75) Inventors: Daniel Laurent, La Suisse (FR); Jean-Jacques Charaudeau, La Suisse (FR); Pierre Varenne, La Suisse (FR)

(73) Assignee: Conception et Développement Michelin S.A., Givisiez (CH)

( * ) Notice: Subject to any disclaimer, the term of this patent is extended or adjusted under 35 U.S.C. 154(b) by 64 days.

(21) Appl. No.: 10/301,083

(22) Filed: Nov. 21, 2002

(65) Prior Publication Data

US 2003/0098197 A1 May 29, 2003

(30) Foreign Application Priority Data

Nov. 23, 2001 (FR) .............................................. 01 15221

(51) Int. Cl.[7] .............................................. B62D 05/04
(52) U.S. Cl. ...................................................... 180/443
(58) Field of Search ................................ 180/402–446; 310/80, 112, 114; 74/388 PS, 421 A

(56) References Cited

U.S. PATENT DOCUMENTS

| | | | | |
|---|---|---|---|---|
| 3,679,956 A | * | 7/1972 | Redmond ................... | 318/564 |
| 3,735,228 A | * | 5/1973 | Redmond ................... | 318/564 |
| 4,179,944 A | * | 12/1979 | Conner ...................... | 74/89.26 |
| 4,215,592 A | * | 8/1980 | Calvert ...................... | 74/661 |
| 4,304,375 A | * | 12/1981 | Builta et al. .............. | 244/17.13 |
| 4,521,707 A | * | 6/1985 | Baker ......................... | 310/80 |
| 4,614,128 A | * | 9/1986 | Fickler ...................... | 74/89.31 |
| 4,637,272 A | * | 1/1987 | Teske et al. ............... | 74/89.26 |
| 4,834,319 A | * | 5/1989 | Ewy et al. ................. | 244/75 R |
| 4,858,491 A | * | 8/1989 | Shube ....................... | 74/665 B |
| 5,152,381 A | * | 10/1992 | Appleberry ............... | 477/21 |
| 5,347,458 A | * | 9/1994 | Serizawa et al. .......... | 701/41 |
| 5,374,877 A | * | 12/1994 | Imaseki et al. ............ | 318/34 |
| 5,670,856 A | * | 9/1997 | Le et al. .................... | 318/564 |
| 6,394,218 B1 | | 5/2002 | Heitzer ...................... | 180/402 |
| 6,548,969 B2 | * | 4/2003 | Ewbank et al. ............ | 318/34 |
| 2004/0040778 A1 | * | 3/2004 | Katou et al. ............... | 180/402 |

FOREIGN PATENT DOCUMENTS

| | | |
|---|---|---|
| DE | 2991559 | 1/2000 |
| DE | 19941474 | 3/2001 |
| EP | 1122150 | 8/2001 |
| EP | 1219525 | 7/2002 |
| GB | 2314910 | 1/1998 |
| WO | 0123242 | 4/2001 |

OTHER PUBLICATIONS

U.S. Patent Publication No. 2002/0084757, Jul. 4, 2002.

* cited by examiner

*Primary Examiner*—Lesley D. Morris
*Assistant Examiner*—Paul Royal, Jr.
(74) *Attorney, Agent, or Firm*—Fitzpatrick, Cella, Harper & Scinto

(57) ABSTRACT

A steering system for a vehicle includes a steerable wheel 1 capable of being steered, a steering wheel 20, and an electrical actuator 3 for altering the steering angle of the steerable wheel. The electrical actuator 3 has three electric motors 31, 32, 33 which act in parallel and three controllers 61, 62, 63 which operate in parallel, each forming part of an electrical control channel for the steering angle. The controller of each electrical channel receives one of the three electrical signals in the control channels and is connected to one of the position sensors and drives one of the electric motors in order to set the said steering angle. The torques delivered by the respective motors are added together in normal operation. The system also includes an interconnection bus 8 for the three electrical control channels, and means for detecting a discrepancy in the status of one electrical channel with respect to the other two, in order to give a malfunction warning and maintain operation in a downgraded mode in the event of a discrepancy.

15 Claims, 6 Drawing Sheets

A.A

B.B

C.C

ELECTRICAL STEERING FOR VEHICLE, WITH TRIPLE REDUNDANCY

BACKGROUND OF THE INVENTION

1. The Field of the Invention

The present invention concerns the steering of road motor vehicles. More particularly, it relates to an electrical steering system without any mechanical linkage between the steerable wheels and the steering wheel, which will be referred to herein as "electrical steering" for simplicity. This type of steering is very commonly called "steer by wire".

2. The Related Art

In electrical steering, the following means is substituted for the traditional mechanical and/or hydraulic system, which may be assisted or unassisted, existing between the steering wheel and the steerable wheels. At the steerable wheel level, there is an electrical actuator, preferably an individual one for each steerable wheel, the purpose of which is to set the appropriate steering angle for the respective steerable wheel or wheels. The steering operating means available to the driver of the vehicle may be a traditional steering wheel or a lever such as a joystick, or any other suitable device. The commands given by the driver of the vehicle to his operating device are sent to the actuators via an electrical link, with the entire system being placed under the supervision of a computer loaded with programs suitable for driving the actuator or actuators appropriately.

One of the advantages of this technology is that it is ideally compatible with electronics, the advances in which are making increasingly sophisticated feedback control systems possible, so that the steering of the steerable wheels can not only be subject to the manual controls but can also be supervised by a safety system. For instance, the steerable wheels may be set to an angle which not only takes into account the instructions from the driver of the vehicle, but which also takes into account the dynamic parameters observed in the vehicle.

Electronic steering, therefore, has opened up a much wider field for controlling the stability of a vehicle. For example, whereas an automatic system for correcting the direction of the vehicle currently applies corrective yaw movements using the brakes of only one road wheel, changing over to electrical controls for the various functions in a vehicle makes it possible to alter the steering angle of the different steerable wheels of the vehicle in order to correct its trajectory.

However, the steering of a vehicle is a function which is essential and vital to safety, like the brakes. Therefore, in order to be substituted for the assisted or unassisted mechanical steering almost universally employed at present in all road vehicles, it is essential for an electrical steering system to be extremely reliable. This is why electrical systems are generally designed to be redundant, with a view to avoiding critical consequences in the event of a failure. A further requirement is that the greater complexity of the redundant systems must not, in final analysis, lead to such a probability of failure that it is prevented from improving safety.

SUMMARY OF THE INVENTION

The present invention provides an electrically controlled steering system which is simple and whose operation is very reliable. Its architecture is redundant for all of the electrical components which are used. In order to control the steering of a steerable wheel of a vehicle, the invention also provides a particular electrical actuator which is well suited to this electrical steering system, in which the actuator comprises a reference end and a control end. The control end is displaced with respect to the reference end by at least three electric motors that act in parallel, each electric motor having its own electrical connection which is independent of that of the other electric motors.

The redundancy principle is based on triplication of certain components, namely the position sensors, the electric motors, and the necessary controllers, as well as the electrical lines connecting the various components in question. This makes it possible to create three control channels which operate in parallel. More precisely, the three control channels operate simultaneously (although not necessarily identically should different softwares be used) and lead to identical actions so long as there is no anomaly. This redundancy, which is referred to as active, makes it possible to ascertain with a high degree of reliability which of the three channels is defective, and makes it possible to continue working with two control channels under conditions which are not significantly downgraded, at least until the vehicle has returned to a region in which the vehicle, and especially its passengers, are in safety.

The steering system for vehicles according to the invention comprises:

at least one steerable wheel capable of being steered;

operating means for effecting a change of direction, which deliver three electrical signals that all carry the same information about the required change of direction;

for each of the steerable wheels, an electrical actuator for altering the steering angle of the steerable wheel, the electrical actuator comprising a reference end and a control end which is displacable with respect to the reference end, the electrical actuator being suitably connected to the steerable wheel and having three electric motors which act in parallel in order to displace the control end with respect to the reference end;

for each electrical actuator, three position sensors for sensing the relative position of the control end with respect to the reference end;

three controllers which operate in parallel, each forming part of an electrical control channel for the steering angle, the controller of each electrical channel receiving one of the three electrical signals and being connected to one of the position sensors and driving one of the electric motors in order to set the steering angle, the torques delivered by the respective motors being added together in normal operation;

at least one interconnection bus for the three electrical control channels; and means for detecting a discrepancy in the status of one electrical channel with respect to the other two, in order to change to an operation in a downgraded mode in the event of a discrepancy.

BRIEF DESCRIPTION OF THE DRAWINGS

Exemplary embodiments of the invention are illustrated in the appended drawings, in which.

DETAILED DESCRIPTION OF EXEMPLARY EMBODIMENTS

Figure 1:
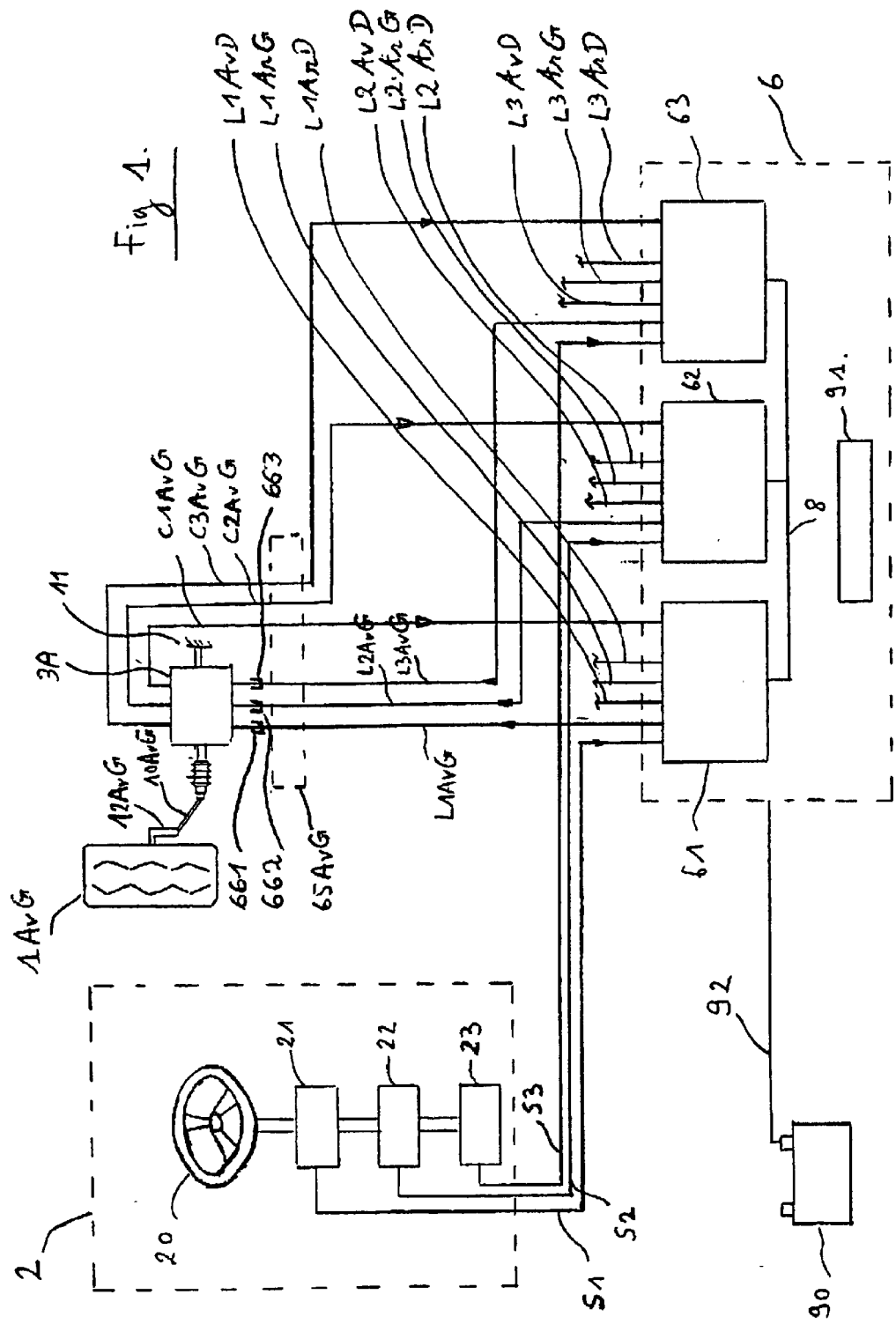
FIG. 1 is a schematic representation of an embodiment of the steering system for vehicles according to the invention.

In FIG. 1, there is shown an operating means 2 for steering the vehicle by the driver. The controls available to the driver of the vehicle may, as already mentioned, be of any suitable type. This may involve a steering wheel 20, but it could also involve any other control lever, such as a joystick or a lever similar to the one described in Patent Application GB 2 314 910. There is no mechanical linkage between the steering wheel 20 and the steerable wheel(s). Three sensors 21, 22 and 23 measure the angle of the steering wheel 20 set by the driver. Each of the sensors 21, 22, 23 forms part of a different electrical channel and delivers one of the electrical signals carrying information about the required change of direction.

A steerable wheel 1AvG is shown, as well as an electrical actuator 3A which is connected, on the one hand, to the body or chassis 11 of the vehicle and, on the other hand, to a connecting rod 10AvG, which is itself connected to a lever 12AvG forming part of a wheel mounting (not shown) in order to control the steering angle of the steerable wheel 1AvG. The specially designed electrical actuator 3A, which could have other uses (for example, it could be used in another electrical steering system), comprises at least three electric motors 31, 32 and 33 acting in parallel (see FIGS. 2 to 5 below. Each electric motor 31, 32 and 33 has its own electrical connection 661, 662 and 663, respectively, which is independent of that of the other electric motors and is intended to connect the motor to a specific controller 61, 62 and 63, respectively, which is different from the controller driving each of the other motors of the same actuator, as will become apparent below.

A central processing unit 6 makes it possible to control the steering of the steerable wheel or wheels. The number of steerable wheels is arbitrary. An electrical bundle 65AvG connects the central processing unit 6 to the group comprising the steerable wheel 1AvG and the actuator 3AvG.

So as not to overburden the diagram of FIG. 1, the electrical bundles connecting the central processing unit 6 to other groups (not shown), each comprising a steerable wheel and its actuator, have been omitted. There are three control channels. In practice, in order to further reduce the probability of a failure, each actuator 3 is electrically connected to the central processing unit 6 by three completely independent bundles or cables (one per control channel), whose paths are also as separate as possible.

By convention, a numerical reference is used on its own when denoting a component of each group without reference to its particular location. The same numerical reference followed by letters indicating the relevant location on the vehicle is used when denoting a component being used for a particular steerable wheel. In the present description and the drawings, the letters AvG denote the front-left location, the letters AvD denote the front-right location, the letters ArG denote the rear-left location and the letters ArD denote the rear-right location.

For a vehicle with multiple steerable wheels, the steering system according to the invention is advantageously such that each controller drives one of the electric motors of the actuator of each of the steerable wheels, each controller making it possible to selectively set an appropriate steering angle for each of the steerable wheels, as a function of at least the location of the steerable wheel on the vehicle, the speed of the vehicle, and the required change of direction.

It has already been seen that the number of steerable wheels is arbitrary. For example, two steerable wheels of a single steering axle may be controlled. The steering axle in this case has two groups of components, each of the groups comprising a steerable wheel and an actuator. As a variant, the steering axle may have a mechanical linkage between the steerable wheels, for instance a steering rack, and the sliding of the rack may be controlled by a single actuator 3. More generally, any number of such groups of components may be installed. For example, a four-wheeled passenger car may be constructed with all four road wheels being steerable wheels and each being steered by its own actuator. This is the example which has been selected for illustrating the present invention in detail.

Figure 2:
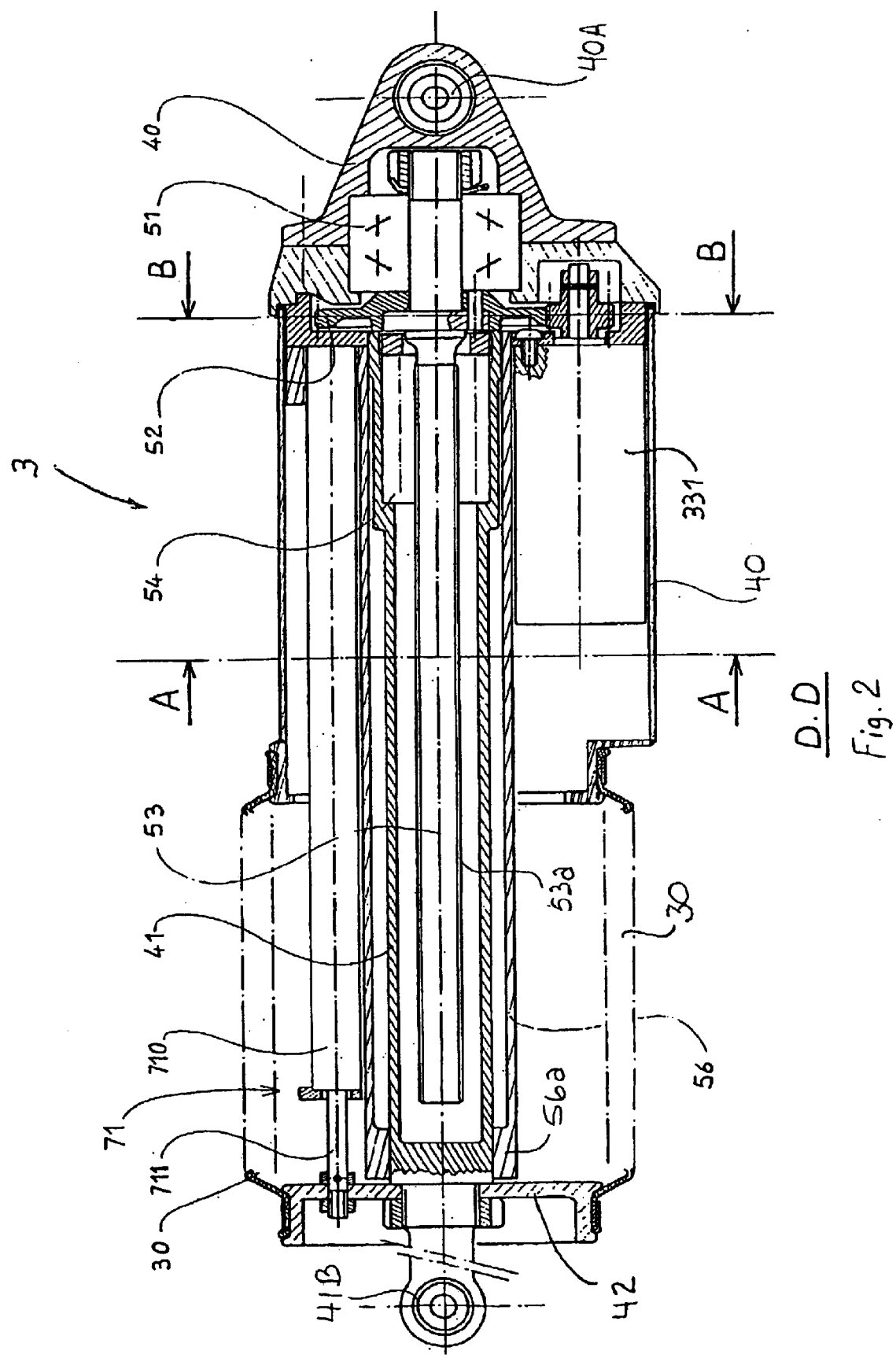
FIG. 2 is a section taken along the line DD in FIG. 3, showing an electrical actuator according to the invention.
Figure 3:
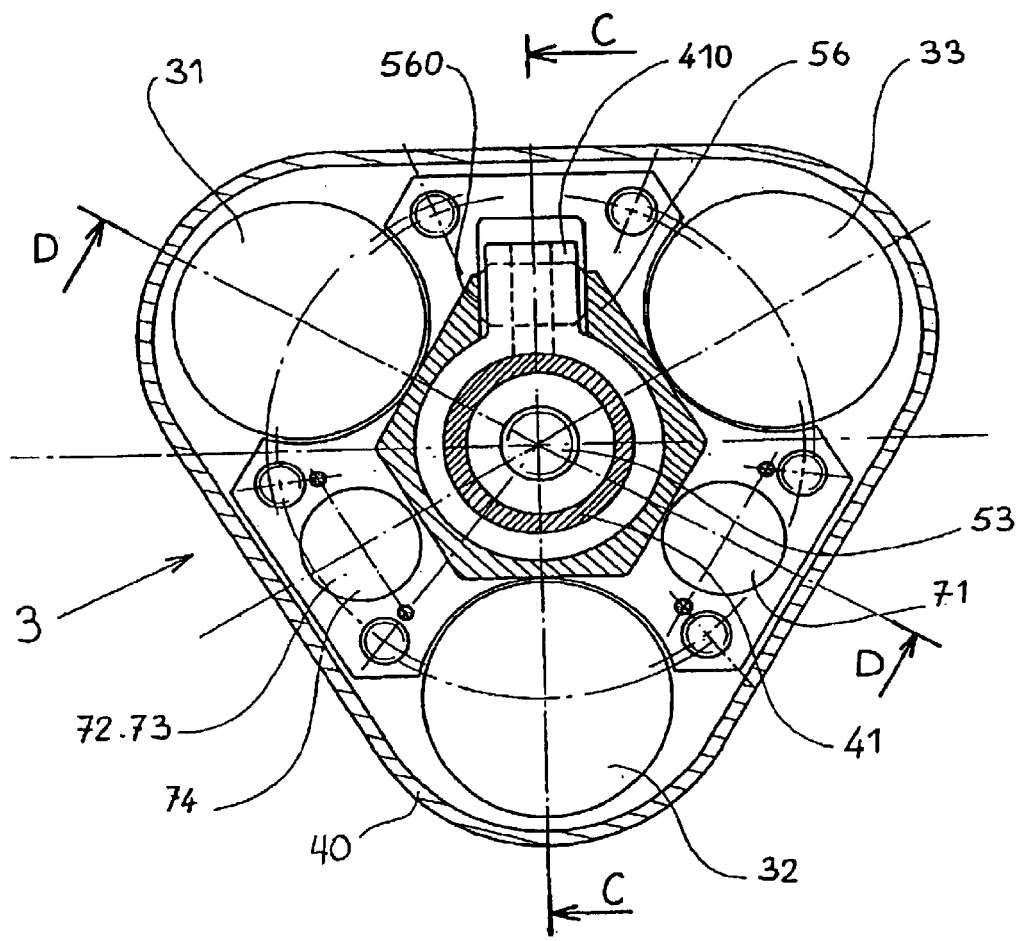
FIG. 3 is a section taken along the line AA in FIG. 2.

Referring now to FIGS. 2 to 5, it can be seen that each actuator 3 has a stationary casing 40 which is used as a mechanical reference, and a rod 41 which is displaced lineally with respect to the reference end 40A of the actuator. In the embodiment being described, the rod 41 can move with respect to the casing 40. Three rotary electric motors 31, 32 and 33, which move the actuator, are shown in FIG. 3. The three electric motors 31, 32 and 33 act in parallel on a rotary screw 53 extending within the rod 41. The rotational movement of the screw 53 is converted into a linear displacement of the rod 41, as will be seen in more detail below. For operational safety reasons, each of the motors 31, 32, 33 is dimensioned so that it is capable of transmitting the necessary torque by itself. During operation in the normal mode, however, the necessary torque is shared between each of the three electric motors, which extends the working life by reducing the stresses and heating experienced by each electric motor. This improves the reliability of the electrical actuator.

The rotary movement of the electric motors is converted into a linear movement by a screw/nut system. Each of the output shafts 310, 320 and 330 of the electric motors 31, 32 and 33, respectively, has a pinion 311, 321 and 331, respectively, meshing with a toothed wheel 52. (see FIG. 4). A sleeve 56 encloses the rod 41. The end 56a of the sleeve 56 forms a bearing which guides the rod 41 as it slides. The toothed wheel 52 is keyed onto the shaft 53, which has a screw thread 53a on one side. The shaft 53 is mounted on a rolling bearing 51 on one side, and on a bearing integrated with the rod 41 on the other side. The outer housing of the rolling bearing 51 is secured to the casing 40 of the electrical actuator. A nut 54 engages with the screw-threaded shaft 53. The sleeve 56 is secured to the casing 40. A protective bellows 30 is fitted onto the casing 40 of the motor on one side and to a disc-shaped member 42 carried by the rod 41 on the other side.

Figure 4:
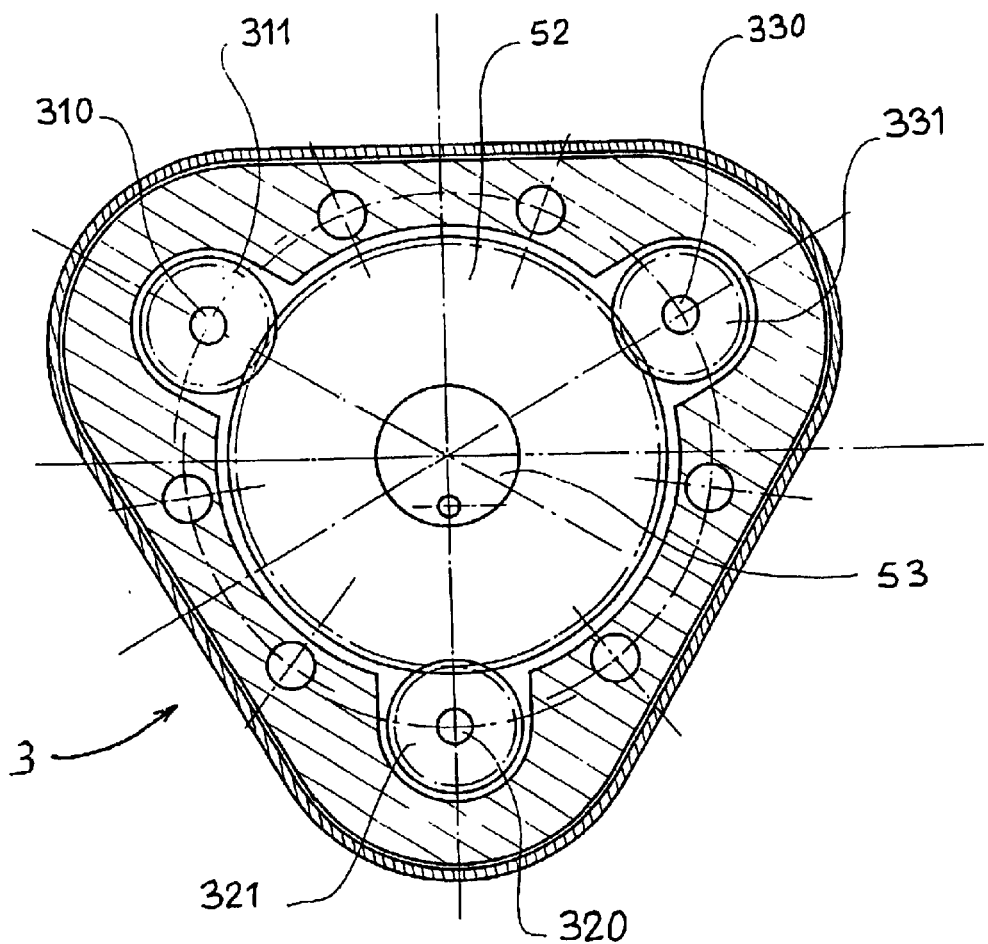
FIG. 4 is a section taken along the line BB in FIG. 2.

In FIG. 4, it can be seen that the pinions 311, 321 and 331 are fitted in a star configuration around the toothed wheel 52, with a constant angular offset of 120° with respect to one another. This is, of course, only a non-limiting design arrangement. In particular, the three motors 31, 32 and 33 could also be fitted side-by-side and concentrically with the rod, with the screw/nut driving of the rod 41.

Figure 5:
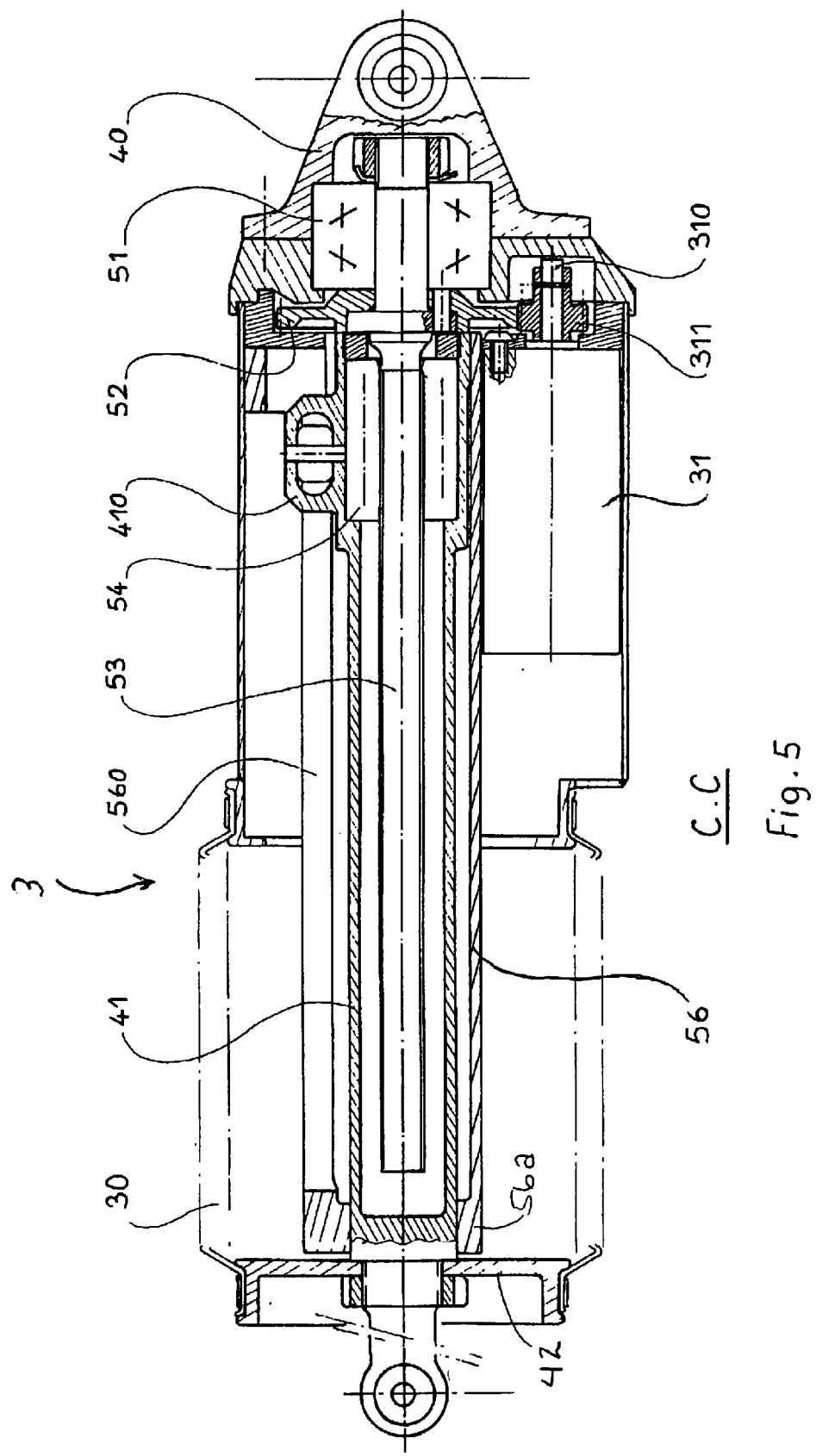
FIG. 5 is a section taken along the line CC in FIG. 3.

In FIGS. 3 and 5, it can be seen that the rod 41 has a protuberance 410, which is itself engaged in a slot 560 in the sleeve 56. In this way, the rod 41 is locked in rotation about its axis. The rotational movement of the screw-threaded shaft 53 is thus converted into a linear displacement of the nut 54 along the shaft 53.

Both FIG. 2 and FIG. 3 show position sensors 71,72 and 73 which are used to ascertain the displacement of the control end 41B, that is to say, of the rod 41, with respect to the reference end 40A of the actuator. The body 710 of the position sensor 71 is secured to the sleeve 56, and therefore to the casing 40 of the actuator 3. A slider 711 is secured to the rod 41 via the disc 42, and can therefore move with it. Two position sensors similar to the position sensor 71, namely the position sensors 72 and 73, are integrated in the same component 74. Each of the position sensors 71, 72, 73 forms part of a different electrical channel.

The central processing unit 6 includes three controllers 61, 62 and 63 (see FIG. 1), which operate in parallel and simultaneously in the normal working mode, and in a way which will become apparent below in the downgraded working mode (that is to say, in the event of a defect occurring, which the system can of course signal, for example, by activating a malfunction warning). Each of the controllers 61, 62 and 63 forms part of an electrical control channel for the steering angle of a steerable wheel. Each steerable wheel is controlled by three electrical control channels. When there are several steerable wheels, each controller 61, 62 or 63 controls the steering angles of all the steerable wheels. Each controller 61, 62 or 63 acquires the information coming from one of the sensors 21, 22 or 23, respectively for the angle of the steering wheel, via the electrical lines S1, S2 or S3, respectively. Furthermore, each controller 61, 62 or 63 drives a motor 31, 32 or 33, respectively, of each electrical actuator 3 for each steerable wheel via the lines L1, L2 or L3, respectively, and receives information about the position of the electrical actuator 3 (which is to say, in practice, information about the steering of the steerable wheel) coming from a position sensor 71, 72 or 73, respectively, for each of the steerable wheels 1, via the electrical lines C1, C2 or C3, respectively. (In FIG. 1, only the lines $L1_{AvG}$, $L2_{AvG}$ and $L3_{AvG}$ and the lines $C1_{AvG}$, $C2_{AvG}$ and $C3_{AvG}$ for the steerable wheel $1_{AvG}$ are shown in full.) Furthermore, for each of the steerable wheels, each controller 61, 62 or 63 acquires the information coming from a current sensor of the electric motor with which it is associated in each of the electrical actuators.

In summary, each controller 61, 62 or 63, controls all of the steerable wheels, and each of the steerable wheels is itself placed under the supervision of three autonomous controllers acting in parallel. The controllers themselves are preferably different, for example, of different types and/or different makes, in order to reinforce the redundancy. Also in order to reinforce the redundancy, the controllers (whether they are of the same makes/types or of different makes/types) are loaded with different software (different series of instructions, different writing languages, different programmers), even though these different software codes all have the same purpose. In other words, each of these software codes is written separately, but nevertheless makes it possible to achieve identical actions on the motors. Such software redundancy limits the risks of a malfunction (bug) occurring in an untested combination of parameters.

The three controllers 61, 62 and 63 are inter-connected by at least one bus 8 and, in real time, exchange all the data useful for describing the electrical and mechanical status of each control channel. The operation of the electrical steering system remains in the normal mode so long as all of the similar parameters of each of the control channels have identical values, to within the tolerances. For example, so long as the steering-wheel angle sensors 21, 22 and 23 are delivering identical signals (to within the tolerances) on the lines S1, S2 and S3, it can be concluded that all three of them are working correctly. So long as the electric currents on each of the lines L1, L2 and L3 connecting the three controllers 61, 62 and 63, respectively, to the three electric motors 31, 32 and 33, respectively, of each actuator 3 have identical values (to within the tolerances), it can be concluded that all the electric motors are working correctly. So long as the position sensors 71, 72 and 73 are delivering identical signals (to within the tolerances) on the electrical lines C1, C2 and C3, it can be concluded that all three of them are working correctly. In summary, it is then concluded that the three electrical control channels are working correctly. Operation is therefore in the normal mode.

There are various conceivable possibilities for working in a downgraded mode. Firstly, owing to the existence of three control channels, it may be assumed that when one of the parameters of one channel has a value which is different from the same parameter in the other two electrical channels, it is the parameter with a different value which forms part of a defective electrical channel. In that case, the steering angle of each of the steerable wheels for which a defect has been identified in a control channel needs to be driven by the two channels which have the same status, that is to say, have kept parameter values that are all identical, to within the tolerances. Specifically, the electric motor of the control channel in which an anomaly has been detected is set to free-wheel. For the other steerable wheels, if there are any, nothing is changed.

It should be noted that, if the electrical channels were only duplicated and not triplicated, in the event of a value divergence is not possible to know directly which electrical channel is the one in the normal working status. Nevertheless, likelihood analyses could be carried out in this case, for example by comparing the various parameters with one another and by analysing the history of the change in these parameters as a function of time. This is the way in which is necessary to deal with the appearance of a possible second downgraded mode in an electrical steering system according to the invention. This type of analysis can be applied generally to the entire vehicle. The parameters can be compared with each of the identical parameters of the other steerable wheels, and in this way it is possible to determine what the downgraded working mode should be. Hence it can be seen that, in the event of an additional anomaly while the electrical steering system is working with only two electrical channels, it is still possible for the electrical steering system provided by the invention to be operated in a second downgraded mode. Here again, the electric motor of the control channel in which an anomaly has been detected is set to free-wheel.

Furthermore, the electrical steering system must still be capable of working in the event of a defect in the electrical power supply. This is why the central processing unit 6 has a back-up battery 91 which automatically steps in for the vehicle's main battery 90 in the event that the latter fails, or in the event that the supply line 92 between the main battery 90 and the drive unit 6 fails, in order to provide a back-up supply for the electrical steering system in the event that the normal supply fails, while also sending an appropriate warning. In normal operation, the auxiliary battery is recharged or kept in its fully charged status by drawing energy from the main battery 90. The back-up battery 91 is configured so that it can store an amount of energy which is sufficient to permit the vehicle's steering to operate for a predetermined minimum safety time, which is at least long enough to make it possible to stop the vehicle under satisfactory safety conditions after having left a more particularly dangerous place. Each of the controllers 61, 62 and 63 has a back-up supply coming from the back-up battery, with separate and protected individual circuits (not shown).

The principle of an electrical steering system can be implemented irrespective of the type of steering operating means. The steering operating means (device for causing a change of direction) can be a steering wheel or a joystick, or any other suitable device. Furthermore, the electrical steering system of the invention is very highly compatible with systems for automatically controlling the directional stability of the vehicle. In that case, the steering angle set for each of the steerable wheels is not only determined by the operating means which the driver of the vehicle operates, but furthermore takes into account corrective setpoint values coming from a system for controlling the stability of the vehicle, which takes the decision to add or subtract a steering angle to or from the driver's intended angle in order to keep the direction of the vehicle within safety conditions.

Figure 6:
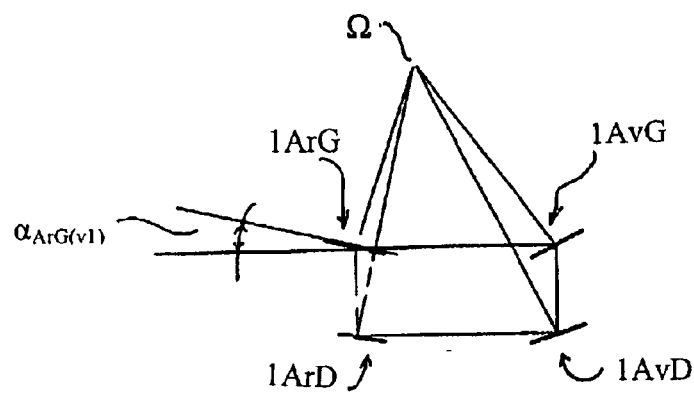
FIG. 6 is a diagram illustrating a possible application of the steering system according to the invention for a passenger vehicle with four steerable wheels.
Figure 7:
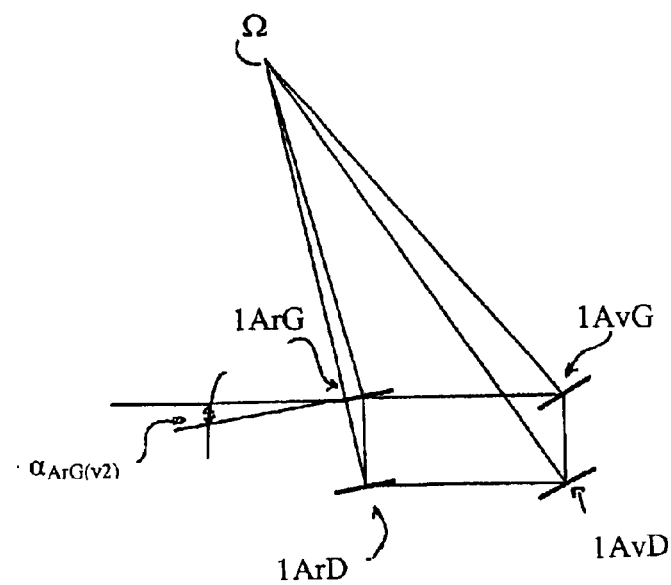
FIG. 7 illustrates the same vehicle moving at a different speed from that illustrated in FIG. 6.

FIGS. 6 and 7 illustrate an application to a system with four steerable wheels. Electrical steering can be adapted very easily to the longitudinal speed at which the vehicle is moving. When maneuvering at very low speed, it is useful to steer the rear steerable wheels in the opposite direction to the front steerable wheels in order to improve the mobility of the vehicle, as shown by FIG. 6. The vehicle is turning left and, in particular, the steering angle of the left rear steerable wheel $\alpha_{ArG(v1)}$ at the speed v1 has been indicated. At a much higher speed, it is known that it is useful to steer the rear steerable wheels in the same direction as the front steerable wheels, but by a smaller angle, in order to maintain good stability of the vehicle. This is what is illustrated in FIG. 7, in which the vehicle is still turning left and, in particular, the steering angle of the left rear steerable wheel $\alpha_{ArG(v2)}$ at the speed v2 has been indicated (the angle values shown are for illustrative purposes and are not representative of a real situation).

In general, selective steerable wheel-by-steerable wheel control of the steering angle, on the basis of the steering-wheel angle set by the driver of the vehicle and the longitudinal speed at which the vehicle is moving, makes it possible to determine what the ideal instantaneous center of rotation is for the vehicle. The instantaneous center of rotation is identified by the point $\Omega$ in FIGS. 6 and 7. Starting from the moment when the instantaneous center of rotation is selected, and by joining it to the center of each of the steerable wheels, it is possible to calculate the steering angle of each of the steerable wheels so that the plane of the steerable wheel is oriented perpendicularly to the line joining the center of the respective steerable wheel to the instantaneous center of rotation $\Omega$ of the vehicle. To within the slip of the tires, the vehicle turns around the instantaneous center of rotation $\Omega$ of the vehicle. The instantaneous center of rotation $\Omega$ of the vehicle is continuously calculated dynamically, as a function of the driving conditions (speed of the vehicle, yaw rate, etc.).

Although the invention has been described herein by reference to exemplary embodiments thereof, it will be understood that such embodiments may be modified and varied without departing from the inventive concepts disclosed. All such modifications and variations, therefore, are intended to be encompassed within the spirit and scope of the amended claims.

What is claimed is:

1. An electrical steering system for a vehicle, comprising:
   at least one steerable wheel capable of being steered;
   operating means for effecting a change of direction, which deliver three electrical signals that all carry the same information about the required change of direction;
   for each of the steerable wheels, an electrical actuator for altering the steering angle of the steerable wheel, the electrical actuator comprising a reference end and a control end which is displacable with respect to the reference end, the electrical actuator being suitably connected to the steerable wheel, the actuator having three electric motors which act in parallel in order to displace the control end with respect to the reference end;
   for each electrical actuator, three position sensors for sensing the relative position of the control end with respect to the reference end;
   three controllers which operate in parallel, each forming part of an electrical control channel for the steering angle, the controller of each electrical channel receiving one of the three electrical signals and being connected to one of the position sensors and driving one of the electric motors in order to set the steering angle, the torque delivered by each of the motors being added together in normal operation;
   at least one interconnection bus for the three electrical control channels; and
   means for detecting a discrepancy in the status of one electrical channel with respect to the other two, in order to change to operation in a downgraded mode in the event of a discrepancy.

2. The steering system according to claim 1, in which a malfunction warning is activated in the downgraded mode.

3. The steering system according to claim 1, in which, in the downgraded mode, the steering control is carried out by the two electrical channels which have the same status.

4. The steering system according to claim 1, in which the operating means have a operating device which the driver of the vehicle operates, and which has three sensors for ascertaining the position of the operating means, each of the sensors forming part of one of the electrical channels and delivering one of the electrical signals.

5. The steering system according to claim 1, for a vehicle having a main battery of accumulators, in which the normal electrical power supply comes from the main battery, and having a back-up battery which is automatically charged by the main battery in normal operation, and which automatically provides a back-up supply for the steering system in the event that the normal supply fails.

6. The steering system according to claim 5, wherein a warning is generated in the event the normal supply fails.

7. The steering system according to claim 1, for a vehicle with multiple steerable wheels, in which each controller drives one of the electric motors of the actuator of each of the steerable wheels, each controller making it possible to selectively set a suitable steering angle for each of the steerable wheels, as a function of at least the location of the respective steerable wheel on the vehicle, the speed of the vehicle and the required change of direction.

8. The steering system according to claim 1, in which each electric motor has its own electrical connection which is independent of that of the other electric motors.

9. The steering system according to claim 1, in which the control end is a rod which is displaced linearly with respect to the reference end, the electric motors being rotary motors, and the rotational movement of the electric motors being converted into a linear displacement of the rod by a screw-nut device.

10. The steering system according to claim 1, in which each electrical activator has at least three position sensors which measure the displacement of the control end with respect to the reference end.

11. An electrical actuator, comprising:
- a stationary casing comprising a connecting reference end;
- a rod which is displaced linearly with respect to the connecting reference end, said rod having a control end;
- at least three electric motors that act in parallel to displace the control end of the rod with respect to the connecting reference end, each electric motor being included in said stationary casing and having its own electrical connection which is independent of that of the other electric motors.

12. The electrical actuator according to claim 11, in which the electric motors are rotary motors, and the rotational movement of the electric motors being converted into a linear displacement of the rod by a screw-nut device.

13. The electrical actuator according to claim 11, having at least three position sensors which measure the displacement of the control end with respect to the reference end.

14. The electrical actuator according to claim 11, comprising a protective bellows fitted onto the casing of the motor on one side and to the rod on the other side.

15. The electrical actuator according to claim 12, comprising a toothed wheel mounted onto a shaft, said shaft having a screw thread on one side, the shaft being mounted on a rolling bearing on one side and on a bearing integrated with the rod on the other side.

* * * * *